(12) United States Patent
Sawada et al.

(10) Patent No.: US 8,091,404 B2
(45) Date of Patent: Jan. 10, 2012

(54) ABNORMALITY DIAGNOSIS APPARATUS FOR $NO_x$ SENSOR

(75) Inventors: Hiroshi Sawada, Gotenba (JP); Shinichiro Imamura, Chiryu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 336 days.

(21) Appl. No.: 12/449,892

(22) PCT Filed: Mar. 6, 2008

(86) PCT No.: PCT/JP2008/054555
§ 371 (c)(1),
(2), (4) Date: Sep. 2, 2009

(87) PCT Pub. No.: WO2008/108501
PCT Pub. Date: Sep. 12, 2008

(65) Prior Publication Data
US 2010/0024520 A1 Feb. 4, 2010

(30) Foreign Application Priority Data
Mar. 6, 2007 (JP) ................................ 2007-056043

(51) Int. Cl.
*G01N 21/00* (2006.01)
(52) U.S. Cl. ....................................................... 73/1.06
(58) Field of Classification Search .................. None
See application file for complete search history.

(56) References Cited

U.S. PATENT DOCUMENTS

| | | | |
|---|---|---|---|
| 6,843,240 B1 * | 1/2005 | Hahn et al. ..................... | 123/688 |
| 2001/0002550 A1 * | 6/2001 | Zhang et al. .................. | 73/118.1 |
| 2003/0192305 A1 * | 10/2003 | Iihoshi et al. ................... | 60/277 |
| 2008/0148830 A1 * | 6/2008 | Wickert et al. ............. | 73/114.71 |

FOREIGN PATENT DOCUMENTS

| | | | |
|---|---|---|---|
| DE | 10 2004 051 747 A1 * | | 4/2006 |
| JP | A-4-72446 | | 3/1992 |
| JP | A-2002-47979 | | 2/2002 |
| JP | A-2003-120339 | | 4/2003 |
| JP | A-2004-270468 | | 9/2004 |
| JP | A-2006-348778 | | 12/2006 |

OTHER PUBLICATIONS

Japanese Office Action issued in Japanese Patent Application No. 2007-056043 on Oct. 23, 2009 (with translation).

* cited by examiner

*Primary Examiner* — Robert R Raevis
(74) *Attorney, Agent, or Firm* — Oliff & Berridge, PLC

(57) ABSTRACT

An NOx catalyst of storage reduction type and an after-catalyst NOx sensor are provided in an exhaust passage in an internal combustion engine. The after-catalyst NOx sensor detects the NOx concentration on the downstream side of the NOx catalyst. The NOx concentration on the upstream side of the NOx catalyst is detected or estimated. The possible abnormality of the after-catalyst NOx sensor is determined by comparing the NOx concentration on the upstream side of the NOx catalyst detected or estimated and the NOx concentration detected by the after-catalyst NOx sensor, under the condition that the NOx catalyst does not substantially absorb NOx in exhaust gas. Abnormality diagnosis is performed with the possible impact of the NOx catalyst inhibited.

4 Claims, 5 Drawing Sheets

ABNORMALITY DIAGNOSIS APPARATUS
FOR $NO_x$ SENSOR

TECHNICAL FIELD

The present invention relates to an abnormality diagnosis apparatus, and in particular, to an apparatus diagnosing, for abnormality, an NOx sensor provided downstream of an NOx catalyst of storage reduction type.

BACKGROUND ART

NOx catalysts purifying NOx (nitrogen oxide) contained in exhaust gas are commonly known as exhaust purification apparatuses located in exhaust systems of internal combustion engines such as diesel engines or lean burn gasoline engines. Various types of NOx catalysts are known, and an NOx catalyst of storage reduction type (NSR: NOx Storage Reduction) is well known to absorb and remove NOx in exhaust gas. The NOx catalyst of storage reduction type exerts an NOx absorbing and releasing effect so as to absorb NOx in supplied exhaust gas when the exhaust gas has an air-fuel ratio leaner than a predetermined value (typically, a theoretical air-fuel ratio) (that is, the exhaust gas is in an oxygen excess atmosphere), while releasing the absorbed NOx to reduce NOx to $N_2$ when the exhaust gas has an air-fuel ratio richer than the predetermined value (that is, the exhaust gas is in an oxygen poor atmosphere).

Once the NOx catalyst of storage reduction type is saturated with NOx, that is, the NOx catalyst is full of NOx, as a result of absorption, the NOx catalyst can no longer absorb NOx. Thus, at appropriate time intervals, the NOx catalyst is supplied with a reducing agent and thus set in an oxygen poor atmosphere. The absorbed NOx is thus released from the NOx catalyst, which thus recovers the NOx absorbing capability. This is called NOx recovery.

For example, to determine timings for the beginning and end of the NOx recovery, an NOx sensor is provided downstream of the NOx catalyst in order to detect the concentration of NOx in the exhaust gas. For example, when the NOx catalyst becomes full of NOx as a result of absorption, NOx starts to leak downstream of the catalyst. Thus, the NOx recovery may be started when the NOx sensor detects the leaking NOx. Furthermore, when the NOx concentration detected by the NOx sensor during the NOx recovery decreases sufficiently, all of the absorbed NOx is determined to have been released. Thus, the NOx recovery may be ended.

For example, for engines mounted in vehicles, laws in many countries require that the abnormality of the catalyst or the sensor be detected in a vehicle mounted condition (on-board) in order to prevent possible traveling in a deteriorated exhaust gas condition. Relatively many techniques are available for detecting the abnormality of the catalyst. However, at present, no effective technique is available for detecting the abnormality of the NOx sensor provided downstream of the NOx catalyst as described above. In particular, emission restrictions have been tightened, and there has been a demand for proper detection of not only defects such as an open circuit but also the rationality of sensor outputs for degradation or the like. Thus, drastic measures for dealing with this are required.

For the abnormality diagnosis of the NOx sensor, a method is possible in which a plurality of NOx sensors are provided at the same position so that detected values from the sensors can be relatively compared with one another or in which the NOx sensor is removed and checked using a fixed analyzer. However, the former method increases costs, and the latter method prevents onboard diagnoses.

Japanese Patent Application Laid-Open No. 2003-120399 discloses an abnormality detection apparatus for an NOx sensor provided downstream of an NOx absorber. The NOx concentration of exhaust gas reaching the NOx sensor is forcibly varied. If variation in NOx sensor output value deviates from possible variation during the normal condition of the sensor, the NOx sensor is determined to be abnormal.

However, the exhaust gas reaching the NOx sensor has passed through the NOx absorber. Thus, the NOx concentration of the exhaust gas corresponds to one obtained after NOx has been absorbed by the NOx absorber. That is, the impact of the NOx absorber located before the sensor is reflected in the output value from the NOx sensor. This may reduce the accuracy of the abnormality diagnosis of the NOx sensor.

DISCLOSURE OF THE INVENTION

In view of the above-described circumstances, an object of the present invention is to provide an abnormality diagnosis apparatus for an NOx sensor which can suitably detect the abnormality of the NOx sensor provided downstream of an NOx catalyst of storage reduction type.

According to a first aspect of the present invention an abnormality diagnosis apparatus for an NOx sensor is provided which is characterized by comprising:

an NOx catalyst of storage reduction type provided in an exhaust passage in an internal combustion engine;

an after-catalyst NOx sensor detecting NOx concentration of exhaust gas on a downstream side of the NOx catalyst, before-catalyst NOx concentration acquiring means for detecting or estimating the NOx concentration of the exhaust gas on an upstream side of the NOx catalyst; and abnormality determining means for determining possible abnormality of the after-catalyst NOx sensor by comparing the NOx concentration detected by the after-catalyst NOx sensor and the NOx concentration detected or estimated by the before-catalyst NOx concentration acquiring means, under a condition that the NOx catalyst does not substantially absorb NOx in the exhaust gas.

Under the condition that the NOx catalyst does not substantially absorb the NOx in the exhaust gas, the NOx flowing into the NOx catalyst passes through the NOx catalyst without stopping and flows further downstream. Thus, the NOx concentration on the upstream side of the NOx catalyst is substantially equal to that on the downstream side of the NOx catalyst. Thus, if the NOx concentration detected by the after-catalyst NOx sensor is not equal to that on the upstream side of the NOx catalyst, the after-catalyst NOx sensor can be determined to be abnormal. Abnormality diagnosis is performed in a condition similar to that in which no NOx catalyst is present. Thus, the possible impact of the NOx catalyst on the abnormality diagnosis can be eliminated, allowing the abnormality of the after-catalyst NOx sensor to be suitably detected. This ensures a high diagnosis accuracy. Even if the after-catalyst NOx sensor detects an abnormal value, the apparatus can avoid the incorrect determination of whether the NOx catalyst or the after-catalyst NOx sensor is abnormal and reliably determine the after-catalyst NOx sensor to be abnormal.

A second aspect of the present invention corresponds to the first aspect characterized by further comprising catalyst temperature acquiring means for detecting or estimating temperature of the NOx catalyst, and in that the abnormality determining means determines the possible abnormality of the after-catalyst NOx sensor by comparing the NOx concentration detected by the after-catalyst NOx sensor and the NOx concentration detected or estimated by the before-catalyst NOx concentration acquiring means, under a condition that the catalyst temperature detected or estimated by the catalyst temperature acquiring means is such that at the temperature, the NOx catalyst does not substantially absorb the NOx in the exhaust gas.

The NOx catalyst cannot substantially absorb or release NOx when the temperature of the catalyst falls out of a predetermined temperature range. Thus, the NOx catalyst cannot absorb NOx when the catalyst temperature is higher or lower than the temperature range. The second embodiment determines the possible abnormality of the after-catalyst NOx sensor by comparing the after-catalyst and before-catalyst NOx concentrations detected when the catalyst temperature falls out of such a temperature range. This allows the NOx on the upstream side of the NOx catalyst to pass through the NOx catalyst and flow further downstream. Thus, the after-catalyst NOx sensor can be suitably diagnosed for abnormality as is the case with the first aspect.

A third aspect of the present invention corresponds to the first aspect characterized by comprising air-fuel ratio acquiring means for detecting or estimating air-fuel ratio of the exhaust gas flowing into the NOx catalyst, and in that the abnormality determining means determines the possible abnormality of the after-catalyst NOx sensor by comparing the NOx concentration detected by the after-catalyst NOx sensor and the NOx concentration detected or estimated by the before-catalyst NOx concentration acquiring means, under a condition that the air-fuel ratio detected or estimated by the air-fuel ratio acquiring means is equal to or richer than a theoretical air-fuel ratio.

Also when the air-fuel ratio of the exhaust gas flowing into the NOx catalyst is equal to or richer than the theoretical air-fuel ratio, the NOx catalyst releases NOx and cannot absorb NOx. This situation can thus be utilized to diagnose the after-catalyst NOx sensor for abnormality.

A fourth aspect of the present invention corresponds to any one of the first to third aspects characterized by comprising rich spike control means for performing rich spike control for allowing NOx absorbed by the NOx catalyst to be released, and in that the rich spike control means performs the rich spike control before the after-catalyst NOx sensor detects the NOx concentration.

Thus, the NOx absorbed by the NOx catalyst can be released before the NOx concentration is detected, thus eliminating the possible impact of the absorbed NOx during the subsequent detection of the NOx concentration.

A fifth aspect of the present invention corresponds to any one of the first to fourth aspects characterized in that the before-catalyst NOx concentration acquiring means comprises at least one of estimation means for estimating the NOx concentration of the exhaust gas emitted by the internal combustion engine based on an operating condition of the internal combustion engine and a before-catalyst NOx sensor detecting the NOx concentration of the exhaust gas on the upstream side of the NOx catalyst.

A sixth aspect of the present invention corresponds to the fifth aspects characterized in that the before-catalyst NOx concentration acquiring means comprises both the estimating means and the before-catalyst NOx sensor, and the abnormality determining means compares the value of the NOx concentration detected by the after-catalyst NOx sensor, the value of the NOx concentration detected by the before-catalyst NOx sensor, and the value of the NOx concentration estimated by the estimation means to determine the possible abnormality of the after-catalyst NOx sensor and the before-catalyst NOx sensor in a distinguishable manner.

A seventh aspect of the present invention corresponds to any one of the first to sixth aspects characterized in that the abnormality determining means determines the possible abnormality of the after-catalyst NOx sensor based on the NOx concentration detected by the after-catalyst NOx sensor under a condition that the after-catalyst NOx sensor is active.

The present invention is very effective for allowing the suitable detection of abnormality of the NOx sensor provided downstream of the NOx catalyst of storage reduction type.

BEST MODE FOR CARRYING OUT THE INVENTION

The best mode for carrying out the present invention will be described below with reference to the accompanying drawings.

Figure 1:
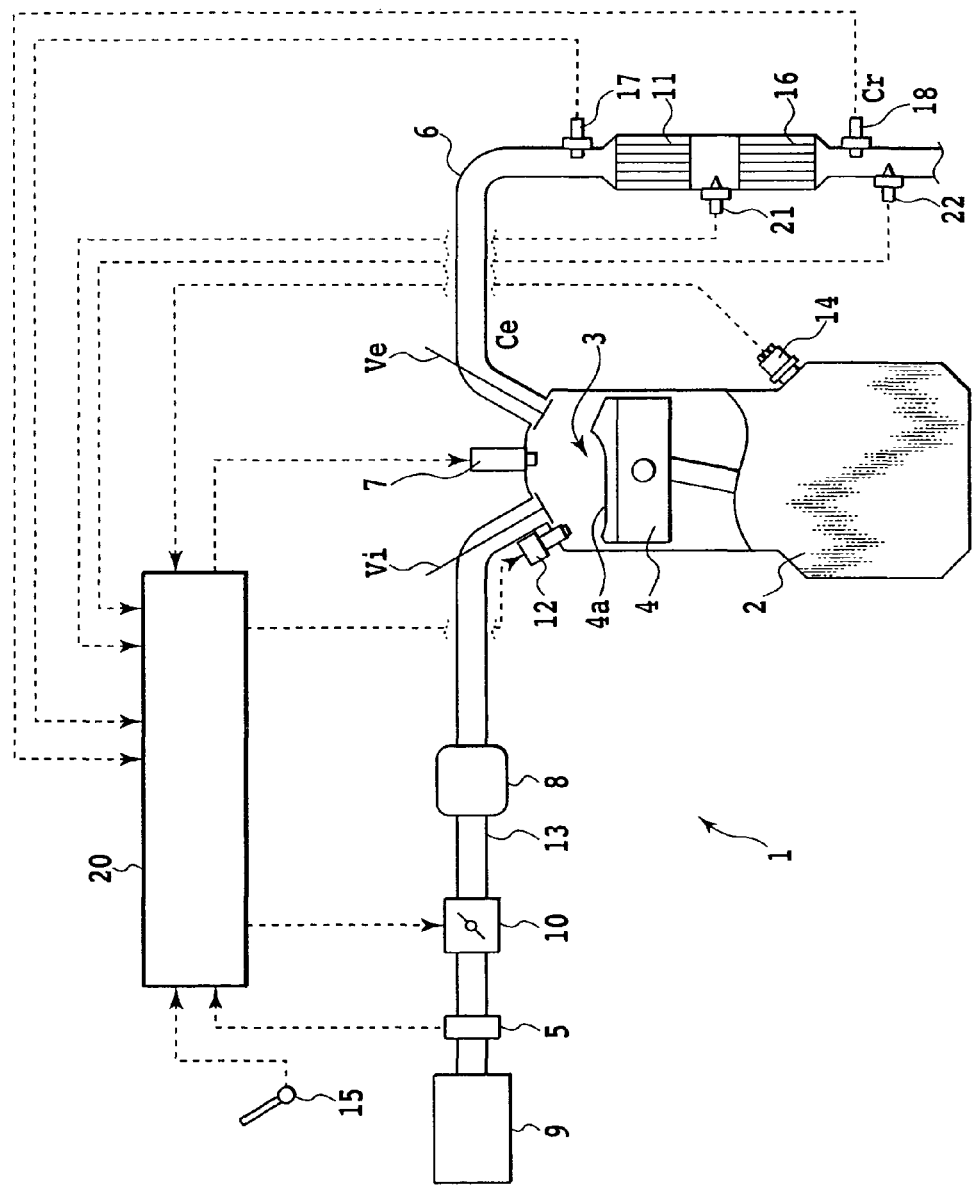
FIG. 1 is a schematic systematic diagram of an internal combustion engine according to an embodiment of the present invention.

FIG. 1 is a schematic systematic diagram of an internal combustion engine according to an embodiment of the present invention. As shown in FIG. 1, the internal combustion engine 1 combusts a mixed gas of fuel and air inside a combustion chamber 3 formed in a cylinder block 2 to reciprocate the piston 4 in the combustion chamber to generate power. The internal combustion engine 1 is a multi-cylinder engine (only one cylinder is shown) for vehicles, specifically, a spark ignition type engine, more specifically, a gasoline engine. However, the internal combustion engine to which the present invention is applied is not limited to the spark ignition type but may be a compression ignition type, that is, a diesel engine.

An intake valve Vi that opens and closes an intake port and an exhaust valve Ve that opens and closes an exhaust port are disposed on the cylinder head of each cylinder of the internal combustion engine 1. The intake valve Vi and the exhaust valve Ve are opened and closed by a cam shaft (not shown in the drawings). Furthermore, an ignition plug 7 is attached to the top of the cylinder head of each cylinder in order to ignite the mixed gas in the combustion chamber 3. Moreover, an injector (fuel injection valve) 12 is disposed on the cylinder head of each cylinder so as to inject fuel directly into the combustion chamber 3. The piston 4 is configured so as to be of what is called a dish top surface type with a recess portion 4a formed in the top surface. In the internal combustion engine 1, with air sucked into the combustion chamber 3, the injector 12 injects fuel toward the recess portion 4a of the piston 4. Thus, a layer of mixed gas of fuel and air is formed (stratified) near an ignition plug 7 and separately from the surrounding air layer. Thus, stable stratified combustion is performed.

The intake port of each cylinder is connected, via a branch pipe for each cylinder, to a surge tank 8 that is an intake air collecting chamber. An intake pipe 13 serving as an intake air collecting passage is connected to the upstream side of the surge tank 8. An air cleaner 9 is provided at the upstream end of the intake pipe 13. An airflow meter 5 detecting the amount of intake air and an electronic control throttle valve 10 are incorporated in the intake pipe 13 and arranged in this order from the upstream side to the downstream side. The intake port, the surge tank 8, and the intake pipe 13 form an intake passage.

On the other hand, the exhaust port of each cylinder is connected, via a branch pipe for each cylinder, to an exhaust pipe 6 serving as an exhaust gas collecting passage. A three way catalyst 11 capable of simultaneously purifying CO, HC, and NOx in exhaust gas is provided on the upstream side of the exhaust pipe 6. An NOx catalyst 16 capable of purifying NOx in the exhaust gas is provided on the downstream side of the exhaust pipe 6. The present embodiment uses a CCL (Catalytic Converter Lean) catalyst unit in which the there way catalyst 11 and the NOx catalyst 16 are accommodated in the same casing. However, the present invention is not limited to this aspect. The three way catalyst 11 and the NOx catalyst 16 may be accommodated in separate casings so as to be individually arranged. The three way catalyst 11 is not necessarily essential and may be omitted. For example, in the diesel engine, the three way catalyst is often omitted.

An air-fuel ratio sensor 17 is installed upstream of the three way catalyst 11 in order to detect the air-fuel ratio (A/F) of the exhaust gas. Furthermore, an NOx sensor detecting the NOx concentration of the exhaust gas, that is, an after-catalyst NOx sensor 18, is installed downstream of the NOx catalyst 16. The air-fuel ratio sensor 17 is made up of what is called a wide-range air-fuel ratio sensor. The air-fuel ratio sensor 17 can continuously detect the air-fuel ratio over a relatively wide range, and outputs current signals proportional to the air-fuel ratio. However, the present invention is not limited to this aspect. The air-fuel ratio sensor 17 may be made up of what is called an $O_2$ sensor providing an output voltage that varies largely at a boundary of a theoretical air-fuel ratio (stoichiometry).

The above-described ignition plug 7, throttle valve 10, injector 12, and the like are electrically connected to an electronic control unit (hereinafter referred to as an ECU) serving as control means. The ECU 20 includes a CPU, a ROM, a RAM, an I/O port, and a storage device (none of these components are shown in the drawings). Furthermore, as shown in FIG. 1, the ECU 20 connects not only to the airflow meter 5, air-fuel ratio sensor 17, and after-catalyst NOx sensor 18 described above but also to a crank angle sensor 14 detecting the crank angle of the internal combustion engine 1, an accelerator opening sensor 15 detecting accelerator opening, exhaust temperature sensors installed upstream and downstream, respectively, of the NOx catalyst 16, that is, a before-catalyst exhaust temperature sensor 21 and an after-catalyst exhaust temperature sensor 22, and various other sensors, via A/D converters or the like (not shown in the drawings). Based on detected values from the various sensors and the like, the ECU 20 controls the ignition plug 7, the throttle valve 10, the injector 12, and the like and thus ignition timing, fuel injection amount, fuel injection timing, throttle opening, and the like so as to obtain desired outputs. The before-catalyst exhaust temperature sensor 21 is installed at a position between the three way catalyst 11 and the NOx catalyst 16. The after-catalyst NOx sensor 18 adopted includes a heater. The temperature of the after-catalyst NOx sensor 18 is controlled (heat controlled) by the ECU 20. Outputs from the crank angle sensor 14 are used to detect an engine rotation speed Ne.

The three way catalyst 11 simultaneously purifies CO, HC, and NOx when the air-fuel ratio of the exhaust gas flowing into the three way catalyst 11 is close to the theoretical air-fuel ratio (for example, A/F=14.6). The range (window) of the air-fuel ratio within which the three elements can be simultaneously efficiently purified is relatively narrow. Thus, to allow the three way catalyst 11 to function effectively, in one aspect of air-fuel ratio control, the air-fuel ratio of the mixed gas is controlled such that the air-fuel ratio of the exhaust gas flowing into the three way catalyst 11 is close to the theoretical air-fuel ratio. This is called stoichiometric control, and the operational aspect of the engine in which stoichiometric control is performed is called a stoichiometric operation. The stoichiometric control sets a target air-fuel ratio to be equal to the theoretical air-fuel ratio. The amount of fuel injected by the injector 12 or the air-fuel ratio is feedback-controlled so that the air-fuel ratio detected by the air-fuel ratio sensor 17 is equal to the target air-fuel ratio.

On the other hand, in connection with a reduction in fuel consumption, in another aspect of the air-fuel ratio control, the target air-fuel ratio may be set a value higher than the theoretical air-fuel ratio, that is, a lean value. This is called lean burn control. The operational aspect of the engine in which the lean burn control is performed is called a lean burn operation. In the lean burn control, as is the case with the stoichiometric control, the fuel injection amount or the air-fuel ratio is feedback-controlled so that the air-fuel ratio detected by the air-fuel ratio sensor 17 is equal to the target air-fuel ratio. During the lean burn control, the air-fuel ratio of the exhaust gas emitted by the engine may have such a lean value that the three way catalyst 11 cannot substantially purify NOx. The NOx catalyst 16 is provided downstream of the three way catalyst 11 to purify the NOx having passed through the three way catalyst 11 in the above-described case.

An NOx catalyst of storage reduction type (NSR: NOx Storage Reduction) is used as the NOx catalyst 16. The NOx catalyst of storage reduction type is composed of a base material made up of an oxide such as alumina $Al_2O_3$, rare metal such as platinum Pt serving as a catalytic component, and an NOx absorbing component; the rare metal and the NOx absorbing component carried on the surface of the base material. The NOx absorbing material is made up of one selected from alkali metal such as potassium K, sodium Na, lithium Li, and cesium Cs, alkali earths such as barium Ba and calcium Ca, and rare earths such as lanthanum La and yttrium Y.

The NOx catalyst of storage reduction type 16 exerts an NOx absorbing and releasing effect such that the catalyst absorbs the NOx in the exhaust gas flowing into the catalyst, in the form of nitrate when the air-fuel ratio of the exhaust gas is leaner than the theoretical air-fuel ratio and such that the catalyst releases the absorbed NOx when the air-fuel ratio of the exhaust gas flowing into the catalyst is equal to or richer than the theoretical air-fuel ratio. During the lean burn operation, the exhaust air-fuel ratio is leaner than the theoretical air-fuel ratio. Thus, the NOx catalyst 16 absorbs NOx from the exhaust gas. On the other hand, when saturated with NOx, that is, full of NOx, as a result of absorption, the NOx catalyst 16 can no longer absorb NOx. Thus, to allow the NOx catalyst to release the absorbed NOx, rich spike control is performed such that the NOx catalyst 16 is temporarily supplied with exhaust gas with an air-fuel ratio equal to or richer than the theoretical air-fuel ratio. In the rich spike control, the target air-fuel ratio is temporarily set equal to or richer than the theoretical air-fuel ratio so that the air-fuel ratio of the mixed gas or the exhaust gas is controlled to a rich value equal to or lower than the theoretical air-fuel ratio. In this manner, the absorbed NOx is released from the NOx catalyst 16 to recover the NOx storing capability of the NOx catalyst 16. This is called NOx recovery.

Various other methods are available for the rich spike control. For example, a reducing agent supply valve may be separately provided upstream of the NOx catalyst and controllably opened to feed a reducing agent into the exhaust gas. The reducing agent has only to generate a reducing component such as carbon hydride HC or carbon monoxide CO in the exhaust gas. Examples of the possible reducing agent include gas such as hydrogen or carbon monoxide, liquid or gaseous carbon hydride such as propane, propylene, or butane, and liquid fuel such as gasoline, light oil, or kerosene. Preferably, fuel for the engine, that is, gasoline, is used. Alternatively, what is called post injection is possible in which the fuel is injected from the injector 12 into the combustion chamber 3 during the latter phase of an expansion stroke or during an exhaust stroke so that the exhaust gas contains much unburned fuel.

On the other hand, the NOx absorbing and releasing effect of the NOx catalyst 16 cannot substantially exert the NOx absorbing and releasing effect unless the NOx catalyst 16 is within a predetermined operative temperature range. Thus, the present embodiment detects or estimates the temperature of the NOx catalyst 16 (catalyst bed temperature). The temperature of the NOx catalyst 16 can be detected directly by a temperature sensor imbedded in the NOx catalyst. However, the present embodiment estimates the temperature. Specifically, the ECU 20 estimates the catalyst temperature based on a before-catalyst exhaust temperature and an after-catalyst exhaust temperature detected by a before-catalyst exhaust temperature sensor 21 and an after-catalyst exhaust temperature sensor 22, respectively. The estimation method is not limited to this example.

Now, the abnormality diagnosis of the after-catalyst NOx sensor 18 will be described.

The abnormality diagnosis of the after-catalyst NOx sensor 18 in the present embodiment is generally characterized in that the possible abnormality of the after-catalyst NOx sensor 18 is determined by, under the condition that the NOx catalyst 16 does not substantially absorb the NOx in the exhaust gas, allowing the after-catalyst NOx sensor 18 to detect the after-catalyst NOx concentration and detecting or estimating the before-catalyst NOx concentration on the upstream side of the NOx catalyst, and then comparing the before-catalyst NOx concentration with the after-catalyst NOx concentration.

Here, the expression "NOx catalyst does not substantially absorb the NOx in the exhaust gas" means that the normal, non-deteriorated NOx catalyst does not substantially absorb the NOx in the exhaust gas. In other words, the NOx catalyst is normal and is not deteriorated but has its NOx absorbing capability temporarily significantly degraded. This involves a condition in which the NOx absorbing capability of the NOx catalyst is zero. However, the present invention is not limited to this condition.

Under the condition that the NOx catalyst 16 does not substantially absorb the NOx in the exhaust gas, the NOx catalyst 16 does not substantially operate. The NOx flowing into the NOx catalyst 16 passes through the NOx catalyst 16 and flows further downstream. The NOx concentration on the upstream side of the NOx catalyst 16, that is, the before-catalyst NOx concentration is generally equal to the NOx concentration on the downstream side of the NOx catalyst 16, that is, the after-catalyst NOx concentration. Thus, when the difference between the detected value of the after-catalyst NOx concentration and the before-catalyst NOx concentration is equal to or larger than a given value, the after-catalyst NOx sensor 18 can be determined to abnormal. In contrast, when the difference between the detected value of the after-catalyst NOx concentration and the before-catalyst NOx concentration is smaller than the given value, the after-catalyst NOx sensor 18 can be determined to be normal. The abnormality diagnosis is performed in a condition in which the NOx catalyst does not operate, that is, in a condition similar to that in which no NOx catalyst is present. Thus, the possible impact of the NOx catalyst on the abnormality diagnosis can be eliminated, ensuring a high diagnosis accuracy. Even if the after-catalyst NOx sensor detects an abnormal value, the apparatus can avoid the incorrect determination of whether the NOx catalyst or the after-catalyst NOx sensor is abnormal and reliably determine the after-catalyst NOx sensor to be abnormal.

The present embodiment determines the possible abnormality of the after-catalyst NOx sensor by comparing the after-catalyst NOx concentration and before-catalyst NOx concentration detected under the condition that the catalyst temperature, which is an estimated temperature, is such that at the catalyst temperature, the NOx catalyst 16 does not substantially absorb NOx.

As described above, the NOx catalyst 16 cannot substantially absorb or release NOx unless the temperature of the NOx catalyst 16 falls within the predetermined operative temperature range. Thus, when the catalyst temperature is at least either higher or lower than the operative temperature range, the NOx catalyst 16 cannot absorb NOx. Thus, the present embodiment determines the possible abnormality of the after-catalyst NOx sensor by comparing the before-catalyst NOx concentration with the after-catalyst NOx concentration detected when the catalyst temperature is at least either higher or lower than the operative temperature range. The situation where the catalyst temperature falls out of the operative temperature range is utilized to perform the abnormality diagnosis of the after-catalyst NOx sensor. The lower limit temperature Tcmin of the operative temperature range is, for example, 300° C. The upper limit temperature Tcmax of the operative temperature range is, for example, 550° C.

Alternatively, the possible abnormality of the after-catalyst NOx sensor may be determined by comparing the after-catalyst NOx concentration and before-catalyst NOx concentration detected under the condition that the air-fuel ratio (in the present embodiment, the air-fuel ratio detected by the air-fuel ratio sensor 17) of the exhaust gas flowing into the NOx catalyst 16 is equal to or richer than the theoretical air-fuel ratio. When the air-fuel ratio of the exhaust gas flowing into the NOx catalyst 16 is equal to or richer than the theoretical air-fuel ratio, the NOx catalyst 16 can also not release or absorb NOx. Thus, this situation can be utilized to diagnose the after-catalyst NOx sensor for abnormality.

Alternatively, the possible abnormality of the after-catalyst NOx sensor may be determined by comparing the after-catalyst NOx concentration and before-catalyst NOx concentration detected under the condition that as a result of absorption, the NOx catalyst 16 is saturated with (full of) NOx. Also in this case, the NOx catalyst 16 cannot absorb NOx. Thus, this situation can be utilized to diagnose the after-catalyst NOx sensor for abnormality.

On the other hand, the before-catalyst NOx concentration is preferably one of the concentration of NOx in the exhaust gas emitted from the combustion chamber 13 of the engine 10 which concentration is estimated based on the operating condition of the engine 10 (this concentration of NOx is hereinafter referred to as a before-catalyst estimated NOx concentration) and the NOx concentration detected by the NOx sensor provided upstream of the NOx catalyst 16, that is, the before-catalyst NOx sensor (see reference numeral 30 in FIG. 4) (this concentration is hereinafter referred to as a before-catalyst detected NOx concentration).

The present embodiment uses the former before-catalyst NOx concentration, that is, the before-catalyst estimated NOx concentration. Based on the detected value of a parameter indicating the operating condition of the engine, the ECU 20 calculates the before-catalyst estimated NOx concentration according to a pre-created map or the like. The parameter may be at least one of, for example, an engine rotation speed Ne, an intake air amount Ga, an air-fuel ratio A/F, an exhaust temperature Teg, and a fuel injection amount Q. Preferably, based on a load factor (=Ga/Ne) determined from the engine rotation speed Ne and the intake air amount Ga as well as the air-fuel ratio A/F detected by the air-fuel ratio sensor 17, the before-catalyst estimated NOx concentration is calculated according to a predetermined map or the like.

If the latter before-catalyst NOx concentration, that is, the before-catalyst detected NOx concentration, is used, the actual detected value is used. This may enable a possible estimation error to be inhibited if the data in an NOx concentration estimation map is temporally inappropriate. The use of both the former and latter before-catalyst NOx concentrations may enable the diagnosis accuracy to be improved as a result of comparison with the two values.

Since whether the after-catalyst NOx sensor 18 is normal or abnormal is determined based on the before-catalyst NOx concentration, the before-catalyst NOx concentration needs to have an accurate value. Other sites (the injector and the like) of the engine are diagnosed for abnormality by the ECU 20. Thus, provided that no other sites are detected to be abnormal, the before-catalyst estimated NOx concentration can be considered to be accurate. This ensures the accuracy of the before-catalyst estimated NOx concentration and the reliability of the results of abnormality diagnosis of the after-catalyst NOx sensor 18.

In the present embodiment, the three way catalyst 11 is located upstream of the NOx catalyst 16. However, when the after-catalyst NOx sensor 18 is diagnosed for abnormality, the engine is subjected to a lean burn operation to increase the exhaust air-fuel ratio to the degree that the three way catalyst 11 cannot purify NOx, as described below. Thus, the possible impact of the three way catalyst 11 is inhibited, and the three way catalyst 11 can be considered to be absent. Under the condition that the NOx catalyst 16 does not substantially absorb NOx, NOx emitted by the engine can be considered to pass through the three way catalyst 11 and the NOx catalyst 16 without stopping and reach the after-catalyst NOx sensor 18.

Now, the abnormality diagnosis of the after-catalyst NOx sensor 18 will be described in brief with reference to FIG. 2.

Figure 2:
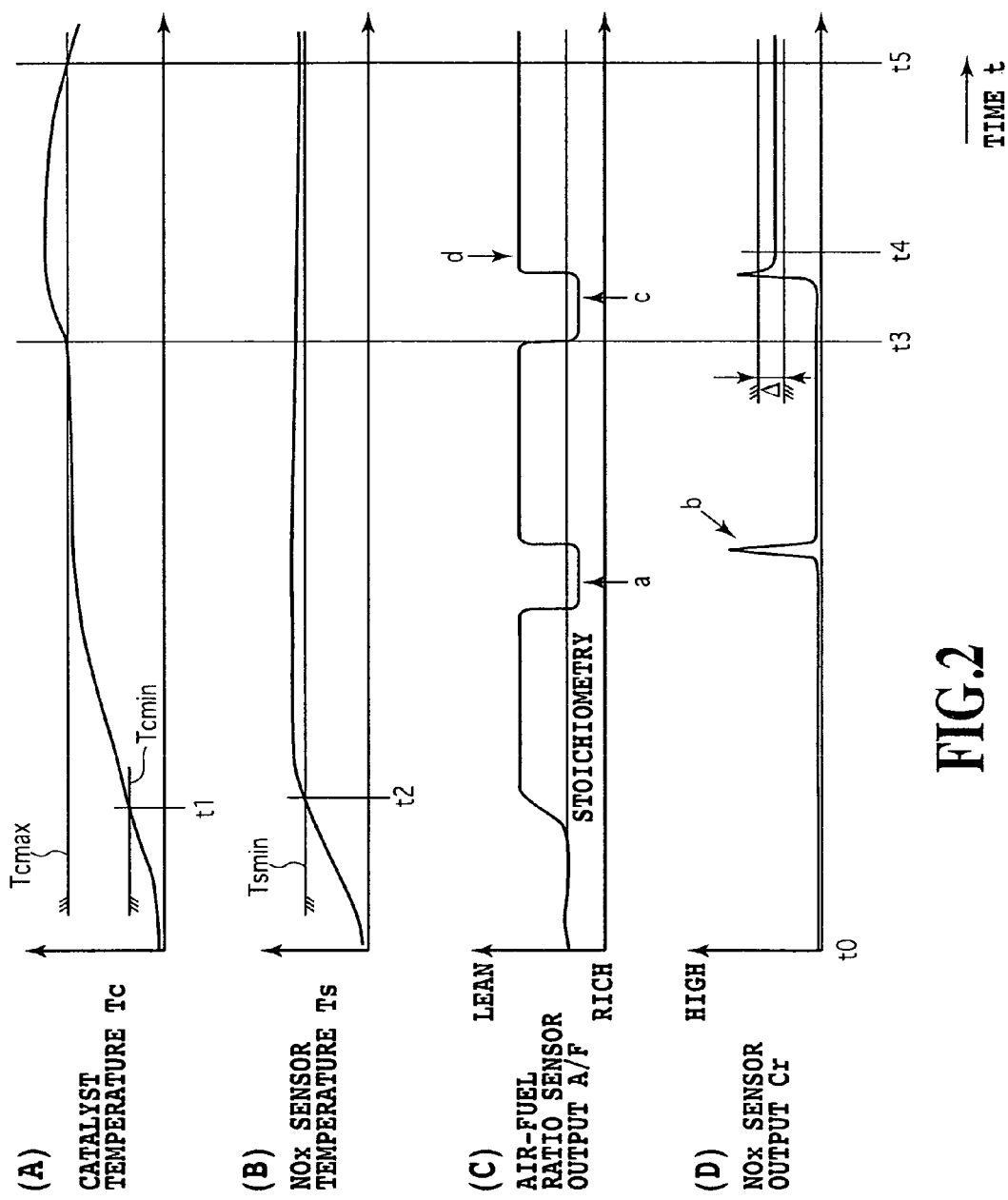
FIG. 2 is a time chart showing the contents of abnormality diagnosis according to the embodiment.

FIG. 2 shows variation in various values after the start of the engine. FIG. 2(A) shows a catalyst temperature Tc estimated by the ECU 20. FIG. 2(B) shows the temperature Ts of the after-catalyst NOx sensor 18 (hereinafter sometimes simply referred to as the sensor temperature). FIG. 2(C) shows output from the air-fuel ratio sensor 17 (in terms of the value of the air-fuel ratio A/F). FIG. 2(D) shows output from the after-catalyst NOx sensor 18 (in terms of the value of the NOx concentration Cr). Time t0 is the time when the engine start is completed. The temperature Ts of the after-catalyst NOx sensor 18 is detected and controlled by the ECU 20. More specifically, the ECU 20 detects the element impedance of the after-catalyst NOx sensor 18, and controls the heater in the after-catalyst NOx sensor 18 so that the element impedance exhibits a predetermined value obtained while the sensor is active.

As shown in FIGS. 2(A) and 2(B), when the engine is started, the catalyst temperature Tc and the sensor temperature Ts rise gradually. The catalyst temperature Tc exceeds the lower limit temperature Tcmin and enters the operative temperature range (time t1). The sensor temperature Ts also exceeds a lower limit temperature Tsmin (for example, about 750° C.) and enters the operative temperature range (time t2). The sensor temperature Ts is thereafter maintained at a value slightly larger than that of the lower limit temperature Tsmin.

As shown in FIG. 2(C), near times t1 and t2, the air-fuel ratio control shifts from stoichiometric control to lean burn control. The air-fuel ratio is maintained at a value (for example, about 16 to 18) larger than that of the theoretical air-fuel ratio (stoichiometry).

At this time, the air-fuel ratio is so high that NOx cannot be purified by the three way catalyst 11. Thus, NOx emitted by the engine passes through the three way catalyst 11. However, the NOx is trapped and absorbed by the succeeding NOx catalyst 16. Thus, as shown in FIG. 2(D), no NOx is emitted downstream of the NOx catalyst 16.

On the other hand, the continuing lean burn operation increases the amount of NOx absorbed by the NOx catalyst 16. Thus, to discharge the absorbed NOx to recover the NOx catalyst 16, the rich spike control is performed as shown by reference character (a) in FIG. 2(C). Specifically, the air-fuel ratio of the mixed gas or exhaust gas is controlled to a rich value smaller than that of the theoretical air-fuel ratio. Thus, the NOx absorbed by the NOx catalyst 16 is released, and detected downstream of the NOx catalyst 16 as shown by reference numeral (b) in FIG. 2D. In the illustrated example, the rich spike is performed before NOx is detected by the after-catalyst NOx sensor 18, that is, before the NOx catalyst 16 becomes full of NOx absorbed. However, the rich spike may be performed after NOx has been detected by the after-catalyst NOx sensor 18, that is, after the NOx catalyst 16 has become full of NOx absorbed.

In the illustrated example, the catalyst temperature Tc thereafter rises gradually and exceeds the upper limit temperature Tc max to deviate from the operative temperature range (time t3). The present embodiment utilizes this timing to diagnose the after-catalyst NOx sensor 18 for abnormality.

First, immediately after the catalyst temperature Tc exceeds the upper limit temperature Tcmax, the rich spike control is performed as shown by reference numeral (c) in FIG. 2C. This is to emit the NOx absorbed by the NOx catalyst 16 before the NOx concentration is detected in order to inhibit the possible impact of the absorbed NOx during the subsequent detection of the NOx concentration. This is, so to speak, a preprocessing rich spike control.

When a predetermined rich spike end condition is met (for example, the after-catalyst NOx sensor 18 detects a peak of the NOx concentration) during the rich spike control, the apparatus ends the rich spike control to shift to the lean burn control shown by reference character (d) in FIG. 2C. Then, since the catalyst temperature Tc is higher than an upper limit temperature Tcmax, the NOx catalyst 16 cannot absorb NOx. Thus, NOx emitted by the engine passes through the three way catalyst 11 and the NOx catalyst 16 without stopping and reaches the after-catalyst NOx sensor 18.

If the after-catalyst NOx sensor 18 is normal, the NOx concentration Cr detected by the after-catalyst NOx sensor 18 in the above-described case should be almost equal to the before-catalyst estimated NOx concentration Ce estimated based on the operating condition of the engine. Thus, after the rich spike is ended, for example, during a predetermined period in which the after-catalyst NOx concentration Cr is stable (time t4), the after-catalyst NOx concentration Cr detected by the after-catalyst NOx sensor 18 is acquired. Furthermore, the before-catalyst estimated NOx concentration Ce during the same period is acquired. Then, the NOx concentrations are compared. If the after-catalyst NOx concentration Cr falls within a predetermined concentration range $\Delta$ (see FIG. 2(D)) based on the before-catalyst estimated NOx concentration Ce, the after-catalyst NOx sensor 18 is determined to be normal. In contrast, if the after-catalyst NOx concentration Cr falls out of the predetermined concentration range $\Delta$, the after-catalyst NOx sensor 18 is determined to be abnormal. In the illustrated example, the after-catalyst NOx sensor 18 is determined to be normal.

In the illustrated example, the catalyst temperature Tc lowers gradually, and at time t5, reaches the upper limit temperature Tcmax or lower to enter the operative temperature range. The after-catalyst NOx concentration Cr and the before-catalyst estimated NOx concentration Ce are acquired during any period between the end of the rich spike and the time when the catalyst temperature Tc becomes equal to or lower than the upper limit temperature Tcmax (t5).

In the described example, the abnormality diagnosis is performed when the catalyst temperature Tc is higher than the operative temperature range. Alternatively or additionally, the abnormality diagnosis may be performed when the catalyst temperature Tc is lower than the operative temperature range. However, in this case, it is at least necessary that the element temperature of the after-catalyst NOx sensor 18 fall within the active temperature range and the after-catalyst NOx sensor 18 be active.

Figure 3:
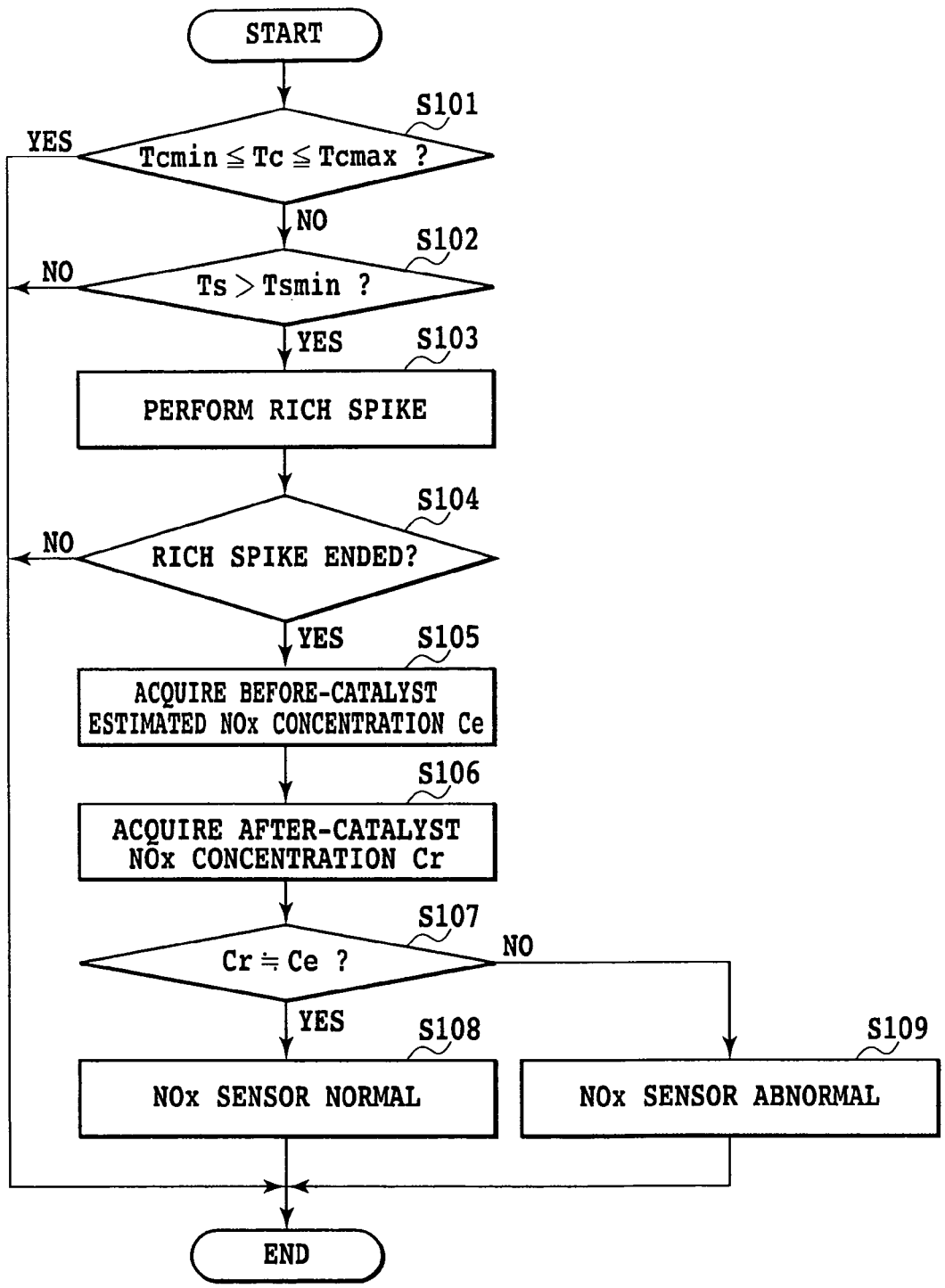
FIG. 3 is a flowchart showing the contents of an abnormality diagnosis process according to the embodiment.

Now, a specific process for performing the abnormality diagnosis described above will be described with reference to FIG. 3. The illustrated process is executed by the ECU 20. A prerequisite for the process is such that lean burn control preventing the three way catalyst 11 from purifying NOx is performed at any time other than during the rich spike control.

In the first step S101, the apparatus determines whether the estimated catalyst temperature Tc falls within the operative temperature range, that is, whether the estimated catalyst temperature Tc is equal to or higher than the lower limit temperature Tcmin and is equal to or lower than the upper limit temperature Tcmax.

If the catalyst temperature Tc falls within the operative temperature range, the present process is ended. In this case, the catalyst temperature Tc may be controlled so as to fall out of the operative temperature range. For example, making the air-fuel ratio richer raises the catalyst temperature Tc. Making the air-fuel ratio leaner lowers the catalyst temperature Tc.

On the other hand, if the catalyst temperature Tc falls out of the operative temperature range, then in step S102, the apparatus determines whether or not the after-catalyst NOx sensor 108 is active, that is, whether or not the temperature Ts of the after-catalyst NOx 18 is higher than the lower limit temperature Tsmin.

If the after-catalyst NOx sensor 18 is not active, the present process is ended. If the after-catalyst NOx sensor 18 is active, the rich spike control is performed in step S103.

Thereafter, in step S104, the apparatus determines whether or not the rich spike control is ended, that is, a predetermined rich spike end condition is met. If the rich spike control is not ended, that is, if the rich spike control is being performed, the present process is ended. If the rich spike control is ended, the process proceeds to step S105. A step waiting for a predetermined time to pass may be additionally carried out between steps S104 and S105.

In step S105, the value of the before-catalyst estimated NOx concentration Ce estimated based on the operating condition of the engine is acquired. Then, in step S106, the value of the after-catalyst NOx concentration Cr detected by the after-catalyst NOx sensor 18 is acquired.

Then, in step S107, the after-catalyst NOx concentration Cr and the before-catalyst estimated NOx concentration Ce are compared to determine whether or not the concentrations are substantially equal Specifically, the difference between the after-catalyst NOx concentration Cr and the before-catalyst estimated NOx concentration Ce, that is, the concentration difference $\Delta C$, is calculated by the equation $\Delta C=|Cr-Ce|$. The apparatus then determines whether or not the concentration difference $\Delta C$ is larger than a predetermined value $\Delta Cs$.

If the concentration difference $\Delta C$ is equal to or smaller than the predetermined value $\Delta Cs$, the after-catalyst NOx concentration Cr is considered to be substantially equal to the before-catalyst estimated NOx concentration Ce, and in step S108, the after-catalyst NOx sensor 18 is determined to be normal. On the other hand, if the concentration difference $\Delta C$ is larger than the predetermined value $\Delta Cs$, the after-catalyst NOx concentration Cr is considered to be relatively significantly different from the before-catalyst estimated NOx concentration Ce, and in step S109, the after-catalyst NOx sensor 18 is determined to be abnormal. Thus, the present process is ended.

As described above, the after-catalyst NOx concentration Cr and the before-catalyst estimated NOx concentration Ce are acquired under the condition (under the temperature condition) that the NOx catalyst 16 cannot substantially absorb NOx. Then, the concentrations acquired are compared to determine the possible abnormality of the after-catalyst NOx sensor 18. Thus, the abnormality diagnosis can be performed without being affected by the intervening NOx catalyst 16. Consequently, suitable abnormality diagnosis with a high diagnosis accuracy can be achieved. The present embodiment also eliminates the need for addition of a specific component such as additional provision of an NOx sensor at the same position as that of the NOx sensor 18. This is economically advantageous and eliminates the need to add complicated control. Of course, the present embodiment is also suitable for onboard diagnosis.

Now, another embodiment of the present invention will be described. This embodiment is generally similar to the above-described embodiment. Thus, differences from the above-described embodiment will be mainly described.

Figure 4:
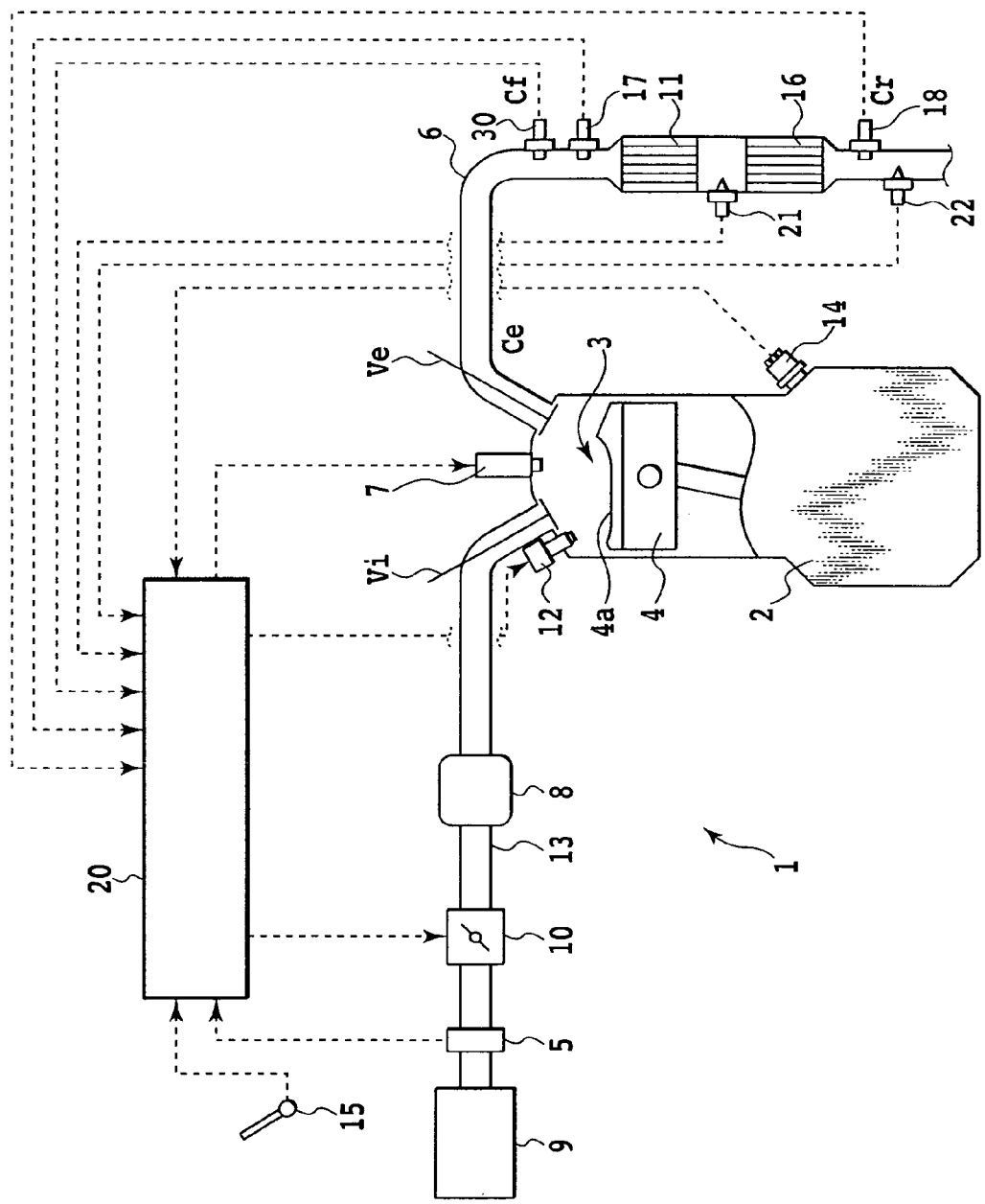
FIG. 4 is a schematic systematic diagram of an internal combustion engine according to another embodiment of the present invention.

As shown in FIG. 4, in an internal combustion engine 1 according to the present embodiment, a before-catalyst NOx sensor 30 is additionally provided in an exhaust passage located upstream of an NOx catalyst 16. The before-catalyst NOx sensor 30 detects the NOx concentration on the upstream side of the NOx catalyst (before-catalyst detected NOx concentration). In the illustrated example, the before-catalyst NOx sensor 30 is located upstream of a three way catalyst 11. However, the present invention is not limited to this example. For example, the before-catalyst NOx sensor 30 may be located between the three way catalyst 11 and the NOx catalyst 16.

In general, The present embodiment compares the after-catalyst NOx concentration detected by an after-catalyst NOx sensor 18, the before-catalyst detected NOx concentration detected by the before-catalyst NOx sensor 30, and the before-catalyst estimated NOx concentration estimated based on the operating condition of the engine. Then, based on the result of the comparison, the possible abnormality of the after-catalyst NOx sensor 18 and the before-catalyst NOx sensor 30 is determined in a distinguishable manner.

More specifically, based on the before-catalyst estimated NOx concentration, the before-catalyst detected NOx concentration is compared with the before-catalyst estimated NOx concentration. The before-catalyst NOx sensor 30 directly senses NOx emitted by the engine so that the sensing is not affected by the three way catalyst 11 and the NOx catalyst 16. Thus, if the before-catalyst detected NOx concentration is significantly different from the before-catalyst estimated NOx concentration, the before-catalyst NOx sensor 30 can be determined to abnormal. Since even the abnormality of the before-catalyst NOx sensor 30 can be detected, the scope of the abnormality diagnosis can be expanded.

Then, if the before-catalyst NOx sensor 30 is determined to be normal, the after-catalyst NOx concentration is compared with the before-catalyst detected NOx concentration. Under the condition that the three way catalyst 11 and the NOx catalyst 16 cannot purify or absorb NOx, the after-catalyst NOx concentration and the before-catalyst detected NOx concentration should be almost equal. Thus, if the after-catalyst NOx concentration is significantly different from the before-catalyst detected NOx concentration, the after-catalyst NOx sensor 18 can be determined to be abnormal. Alternatively, in this case, the after-catalyst NOx concentration may be compared with the before-catalyst estimated NOx concentration.

Figure 5:
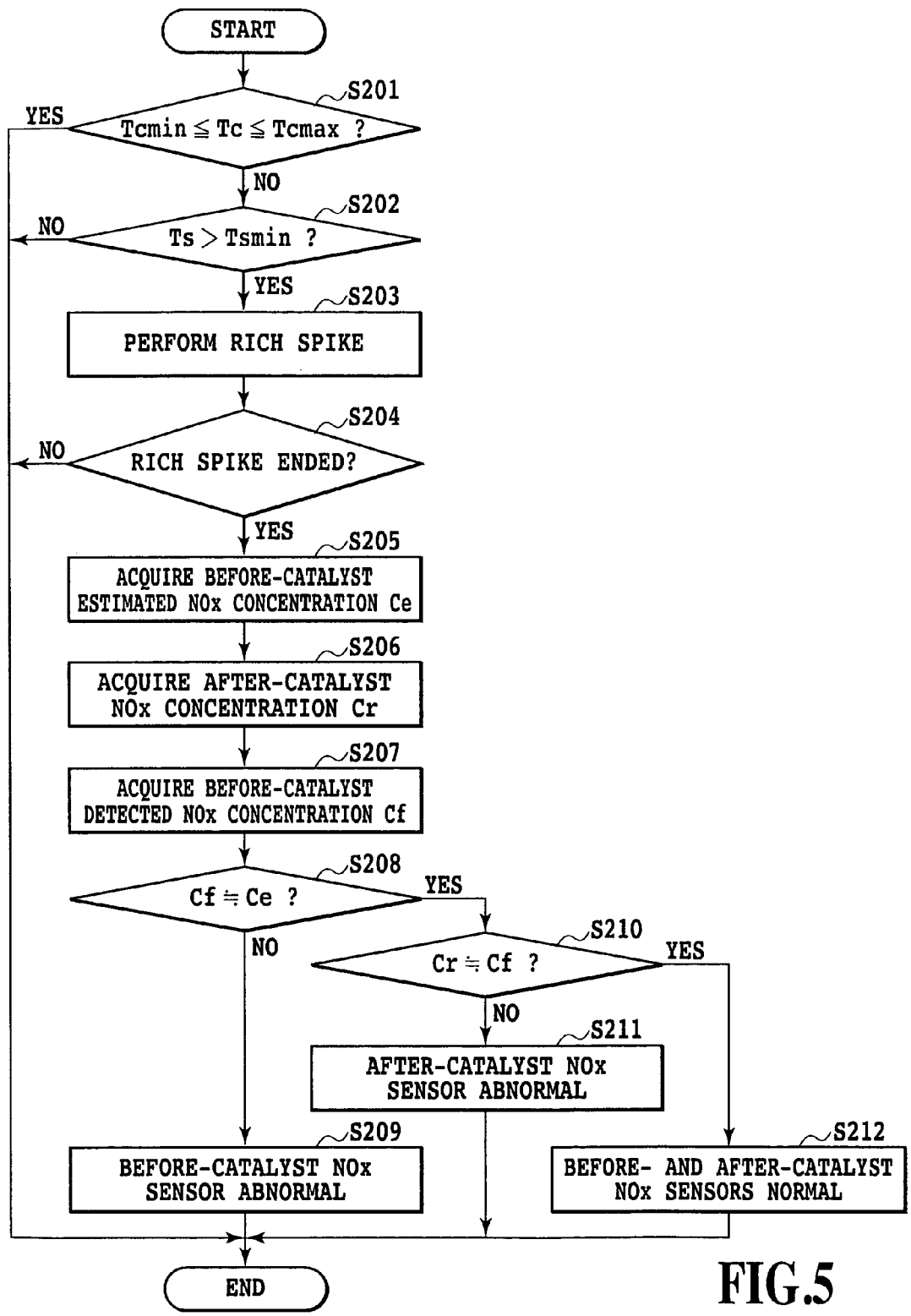
FIG. 5 is a flowchart showing the contents of an abnormality diagnosis process according to another embodiment.

FIG. 5 shows a specific process according to the present embodiment. As described above, it is assumed that the illustrated process is executed by the ECU 20 and that a prerequisite for the process is that such lean burn control as prevents the three way catalyst 11 from purifying NOx is performed at any time other than during the rich spike control.

Steps S201 to S206 are the same as the above-described steps S101 to S106. In step S207, the value of the before-catalyst detected NOx concentration Cf detected by the before-catalyst NOx sensor 30 is acquired.

Thereafter, in step S208, the before-catalyst detected NOx concentration Cf and the after-catalyst NOx estimated NOx concentration Ce are compared to determine whether or not the concentrations are substantially equal. Specifically, the difference between the before-catalyst NOx concentration Cf and the before-catalyst estimated NOx concentration Ce, that is, a first concentration difference $\Delta C1$, is calculated by the equation $\Delta C1 = |Cf - Ce|$. The apparatus then determines whether or not the first concentration difference $\Delta C1$ is larger than a first predetermined value $\Delta C1s$.

If the first concentration difference $\Delta C1$ is larger than the first predetermined value $\Delta C1s$, the before-catalyst detected NOx concentration Cf is considered to be relatively significantly different from the before-catalyst estimated NOx concentration Ce. In step S209, the before-catalyst NOx sensor 30 is determined to be abnormal. On the other hand, if the first concentration difference $\Delta C1$ is equal to or smaller than the first predetermined value $\Delta C1s$, the before-catalyst detected NOx concentration Cf is considered to be substantially equal to the before-catalyst estimated NOx concentration Ce. The process then proceeds to step S210.

In step S210, the after-catalyst NOx concentration Cr and the before-catalyst detected NOx concentration Cf are compared to determine whether or not the concentrations are substantially equal. Specifically, the difference between the after-catalyst NOx concentration Cr and the before-catalyst estimated NOx concentration Cf, that is, a second concentration difference $\Delta C2$, is calculated by the equation $\Delta C2 = |Cr - Cf|$. The apparatus then determines whether or not the second concentration difference $\Delta C2$ is larger than a second predetermined value $\Delta C2s$.

If the second concentration difference $\Delta C2$ is larger than the second predetermined value $\Delta C2s$, the after-catalyst NOx concentration Cr is considered to be relatively significantly different from the before-catalyst estimated NOx concentration Cf. In step S211, the after-catalyst NOx sensor 18 is determined to be abnormal. On the other hand, if the second concentration difference $\Delta C2$ is equal to or smaller than the second predetermined value $\Delta C2s$, the after-catalyst NOx concentration Cr is considered to be substantially equal to the before-catalyst detected NOx concentration Cf. The process then proceeds to step S212.

In step S212, both the before-catalyst NOx sensor 30 and the after-catalyst NOx sensor 18 are determined to be normal. The present process is thus completed.

The embodiments of the present invention have been described. However, the present invention may take other embodiments. For example, the above-described embodiments compare the NOx concentrations based on the difference between the concentrations. However, the present invention is not limited to this aspect, and may compare the NOx concentrations based on the ratio of the concentrations. The preprocessing rich spike control (steps S103 and S203) may be performed immediately after the catalyst temperature Tc falls out of the operative temperature range as is the case with the above-described embodiments or immediately before the catalyst temperature Tc falls out of the operative temperature range. The preprocessing rich spike control may be omitted. The NOx concentration of the exhaust gas may be forcibly controllably varied so as to allow the detected and acquired NOx concentrations to be compared to determine the possible abnormality.

The embodiments of the present invention are not limited to those described above. The present invention includes any variations, applications, and equivalents embraced in the concept of the present invention defined by the claims. Thus, the present invention should not be limitedly interpreted but is applicable to any other technique belonging to the scope of concept of the present invention.

INDUSTRIAL APPLICABILITY

The present invention is applicable to an NOx sensor provided in an exhaust system of an internal combustion engine.

The invention claimed is:
1. An abnormality diagnosis apparatus for an NOx sensor comprising:
an NOx catalyst of storage reduction type provided in an exhaust passage in an internal combustion engine;
an after-catalyst NOx sensor detecting NOx concentration of exhaust gas on a downstream side of the NOx catalyst,
before-catalyst NOx concentration acquiring means for detecting or estimating the NOx concentration of the exhaust gas on an upstream side of the NOx catalyst;
catalyst temperature acquiring means for detecting or estimating temperature of the NOx catalyst;
abnormality determining means for determining possible abnormality of the after-catalyst NOx sensor by comparing the NOx concentration detected by the after-catalyst NOx sensor and the NOx concentration detected or estimated by the before-catalyst NOx concentration acquiring means, under a condition that the catalyst temperature detected or estimated by the catalyst tem- perature acquiring means is such that at the temperature, the NOx catalyst does not substantially absorb the NOx in the exhaust gas; and rich spike control means for performing rich spike control for allowing NOx absorbed by the NOx catalyst to be released, and performing the rich spike control before the after-catalyst NOx sensor detects the NOx concentration.

2. The abnormality diagnosis apparatus for the NOx sensor according to claim 1, wherein the before-catalyst NOx concentration acquiring means comprises at least one of estimation means for estimating the NOx concentration of the exhaust gas emitted by the internal combustion engine based on an operating condition of the internal combustion engine and a before-catalyst NOx sensor detecting the NOx concentration of the exhaust gas on the upstream side of the NOx catalyst.

3. The abnormality diagnosis apparatus for the NOx sensor according to claim 2, wherein the before-catalyst NOx concentration acquiring means comprises both the estimating means and the before-catalyst NOx sensor, and the abnormality determining means compares the value of the NOx concentration detected by the after-catalyst NOx sensor, the value of the NOx concentration detected by the before-catalyst NOx sensor, and the value of the NOx concentration estimated by the estimation means to determine the possible abnormality of the after-catalyst NOx sensor and the before-catalyst NOx sensor in a distinguishable manner.

4. The abnormality diagnosis apparatus for the NOx sensor according to claim 1, wherein the abnormality determining means determines the possible abnormality of the after-catalyst NOx sensor based on the NOx concentration detected by the after-catalyst NOx sensor under a condition that the after-catalyst NOx sensor is active.

* * * * *